US006542194B1

(12) United States Patent
Juen

(10) Patent No.: US 6,542,194 B1
(45) Date of Patent: Apr. 1, 2003

(54) IMAGING APPARATUS THAT STARTS CHARGE ACCUMULATION IN SEQUENCE BASED ON MOVEMENT SPEED ON LIGHT-SHIELDING MEMBER

(75) Inventor: Masahiro Juen, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/115,842

(22) Filed: Jul. 15, 1998

(30) Foreign Application Priority Data

Jul. 17, 1997 (JP) .............................. 9-192125

(51) Int. Cl.[7] .......................... H04N 5/238; H04N 5/335
(52) U.S. Cl. ..................... 348/367; 348/221.1; 348/296; 348/308; 348/310; 348/364
(58) Field of Search ....................... 250/208.1; 348/207, 348/220, 221, 222, 224, 229, 230, 294, 297–305, 307–312, 362–368, 220.1, 221.1, 222.1, 223.1, 224.1, 228.1, 229.1, 230.1; 396/89, 96, 213

(56) References Cited

U.S. PATENT DOCUMENTS

| 4,335,405 | A | | 6/1982 | Sakane et al. ............... 348/297 |
| 4,531,156 | A | * | 7/1985 | Nishizawa ................... 348/307 |
| 4,535,363 | A | * | 8/1985 | Harada ....................... 348/219 |
| 4,742,395 | A | * | 5/1988 | Nagai ......................... 348/296 |
| 4,835,617 | A | * | 5/1989 | Todaka ........................ 348/296 |
| 4,908,709 | A | * | 3/1990 | Inuiya ......................... 348/314 |
| 4,984,088 | A | * | 1/1991 | Tani ............................ 348/296 |
| 5,410,348 | A | | 4/1995 | Hamasaki ................... 348/296 |
| 5,663,760 | A | * | 9/1997 | Kayanuma .................. 348/241 |
| 5,767,904 | A | * | 6/1998 | Miyake ....................... 348/362 |

FOREIGN PATENT DOCUMENTS

| JP | A-55-145481 | 11/1980 | ............ H04N/5/30 |
| JP | A-5-227489 | 9/1993 | .......... H04N/5/335 |

* cited by examiner

Primary Examiner—Ngoc-Yen Vu
(74) Attorney, Agent, or Firm—Oliff & Berridge, PLC

(57) ABSTRACT

An imaging device performs moving image shooting in which smearing does not occur and further performs a still image shooting by a sufficiently accurate shutter operation. The imaging device includes an imaging element that accumulates received light as a charge. A shutter travels so as to shade the imaging element. A first scanning circuit performs a charge accumulation start scanning of the imaging element at a timing and/or speed that matches the travel speed of the shutter. A second scanning circuit performs reading scanning of the charge accumulated in the imaging element. A controller controls the scanning of the first scanning circuit and the second scanning circuit and the travel of the shutter. When the still image is shot by the imaging device, the exposure time is adjusted by the controller controlling the scanning start time of the first scanning circuit and the travel start time of the shutter.

33 Claims, 13 Drawing Sheets

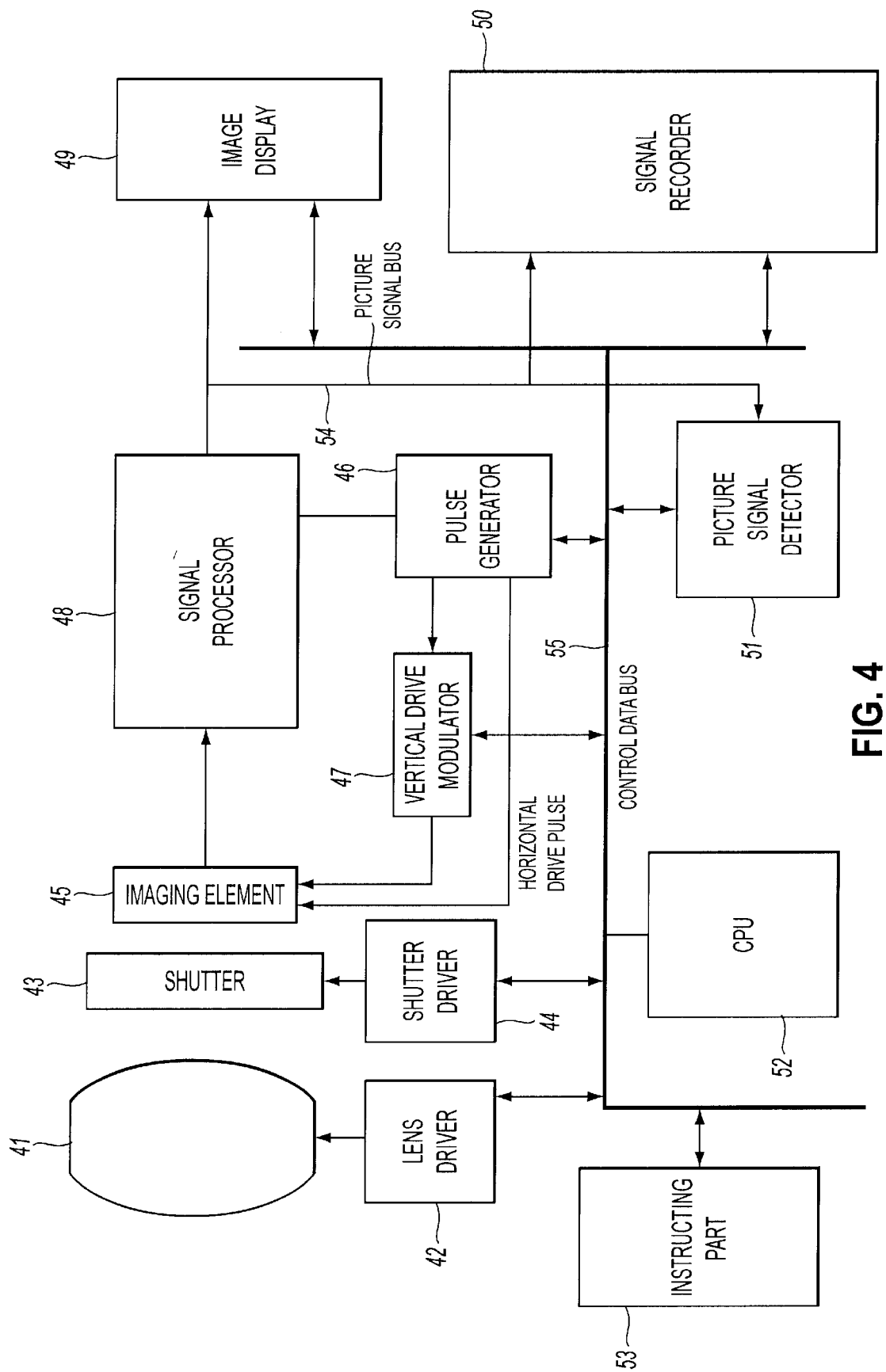

IMAGING APPARATUS THAT STARTS CHARGE ACCUMULATION IN SEQUENCE BASED ON MOVEMENT SPEED ON LIGHT-SHIELDING MEMBER

INCORPORATION BY REFERENCE

The disclosure of the following priority application is herein incorporated by reference: Japanese Patent Application No. 9-192125, filed Jul. 17, 1997.

The disclosures of U.S. Pat. Nos. 4,335,405, 4,535,363 and 5,410,348 are incorporated herein by reference.

BACKGROUND OF THE INVENTION

1. Field of Invention

The present invention relates to an imaging device that shoots images using an imaging element and in which exposure is controlled by controlling an accumulation time of light received by the imaging element, and that is equipped with a shutter that shades the imaging element.

2. Description of Related Art

In an electronic camera that uses a solid-state imaging element, an electronic shutter can be used to perform exposure control by controlling the accumulation time of photoelectric charge of a photosensitive part of the imaging element. Methods of implementing this kind of electronic shutter vary depending upon the imaging element. For example, in the interline (IT) type CCD (charge coupled device) as shown in FIG. 11A, a photoelectric charge is accumulated in the photodiodes of the photosensitive part A during a specified interval and the signal charge is then transferred to a vertical transferring part B. The electronic shutter is further implemented by transferring the signal charge from the vertical transferring part B to an output circuit D via a horizontal transferring part C.

At this time, when the accumulated charge is transferred from the photosensitive part A to the vertical transferring part B, it is known that there is a problem of generating smear (a phenomenon in which a vertical white line can be seen when the light intensity is strong) by leakage of charge or the like from the photosensitive part A.

Additionally, in the frame transferring (FT) type CCD as shown in FIG. 11B, the electronic shutter is implemented by resetting the pixels, that is, by setting the accumulated charge amount of the pixels to zero, and then, after the elapse of a specified exposure time, transferring the charge of the photosensitive part A to the accumulation part E at high speed and further, transferring it to a horizontal transferring part C and then to output circuit D.

However, in the case of the above-mentioned FT-CCD, the generation of smear cannot be controlled because the light can be received (by the photosensitive part A) even during the transfer of charge to the accumulation part E. In particular, the ratio between the photoelectric charge time and the signal transfer time to the accumulating part E for one level of the CCD is equal to the ratio between the signals and the smear amount. Thus, there is a problem in that a high speed electronic shutter cannot be easily realized that sufficiently controls smear.

As a method of solving the problem of smear, it is known to provide the necessary accumulation part (undepicted) needed for the vertical transferring part B of the IT-CCD and to transfer the signal charge from the vertical transferring part B to the accumulation part at high speed. This reduces as much as possible the time that the signal charge stays in the vertical transferring part B, which is adjacent to the photosensitive part A, which is where the smear is generated. However, in such a structure, there is a problem of increasing the chip area. That is, due to the provision of the accumulation part, the overall size of the CCD chip is increased. An additional problem is that when the number of pixels increases, it becomes difficult to transfer signal charge to the accumulation part in a short period of time because the number of the vertical transferring steps increases, and the consumed power becomes large.

Meanwhile, an electronic shutter can be implemented using a scanning method of the so-called XY address type with either an amplifying type image element or with a MOS type imaging element. The electronic shutter can be implemented in such devices by, first, reset-scanning the pixels (performing scanning that temporarily sets the accumulated charge amount of the pixels to zero) per pixel or per line, and after a specified time for one pixel or line, respectively, passes, performing the scanning for reading of the signal (i.e, performing reading scanning).

FIG. 12 shows an example of a MOS type imaging element of the XY address type disclosed in Japanese Laid-Open Pat. Publication No. 55-145481 (corresponding to U.S. Pat. No. 4,335,405). In the image elements of FIG. 12, two circuits, a signal reading scanning circuit (labeled VSRSignal), and a reset scanning circuit (labeled VSRReset), are provided as vertical scanning circuits (VSR). An electronic shutter is implemented by first performing reset scanning in the reset scanning circuit, and then after a specified time, performing the reading scanning in the signal reading scanning circuit.

In the amplifying type imaging element of the XY address type disclosed in Japanese Laid-Open Pat. Publication No. 5-227489 (corresponding to U.S. Pat. No. 5,410,348), the electronic shutter is implemented by dividing the reset scanning and the signal reading scanning by time in one vertical scanning circuit.

However, these kinds of electronic shutters have a problem in that the exposure time in the upper and lower parts is shifted for only the time required for scanning of the screen. Therefore, the scanning of the signal output cannot be performed at high speed, especially when there are many pixels, which limits their use as an electronic shutter.

Furthermore, in an electronic camera that shoots a still image, exposure time control can be performed by opening a mechanical shutter that optically shades the imaging elements from incident light for a required time. However, ordinary moving image photography cannot be performed when the shutter is closed, and thus a separate viewfinder optical system is needed in order to monitor the object prior to shooting.

U.S. Pat. No. 4,535,363 discloses a camera in which a still image is shot and a moving image is shot by opening the shutter before and closing the shutter just after the reading period of the image signal. When that technique is implemented when an IT-CCD imaging element is used, the charges stored in the IT-CCD pixels are reset in a batch, reading is also performed in a batch, and the charges are read into the vertical transferring part, which is shaded from the photosensitive part of the IT-CCD. Therefore, by shading the IT-CCD by a simple shutter structural body such as a rotating shutter, just during the time there is charge in the vertical transferring part of the IT-CCD, it is possible to prevent smear generation. Meanwhile, in order to perform the same technique in an FT-CCD, it is necessary to simultaneously shade all the pixels, and a special shutter such as a diaphragm that doubles as a lens shutter must be used.

However, both of these techniques have not yet solved the problem of smear during shooting of the moving image.

Meanwhile, in the imaging elements of the XY address type, the reading point vanes depending upon each pixel or line. Thus, an effective means that closes the shutter to achieve shading only during reading is not known. In particular, in the amplifying type imaging elements of the XY address type, even though an electronic shutter is implemented, there is an advantage in that there is no smear generation so that the smear does not occur during the shooting of the moving image. However, an imaging device which effectively uses it is not known.

SUMMARY OF THE INVENTION

Therefore, an object of the present invention is to provide an imaging device that shoots a moving image and in which smear does not occur and that further shoots a still image with a sufficiently accurate shutter operation.

According to a first aspect of the present invention, an imaging device includes an imaging element that accumulates charge from received light. A shutter moves so as to shade the imaging element. A controller controls the device to perform charge accumulation start scanning of the imaging element at a timing and/or speed based on the travel speed of the shutter, and then to perform reading scanning of the charges accumulated in the imaging element.

According to this structure, it is possible to shoot a still image in addition to a moving image. When the shutter is caused to travel in order to shoot a still image, it is possible to shoot the still image with a uniform exposure time in all areas of the imaging element.

The controller also can adjust the exposure time by controlling the scanning start time of the charge accumulation start scanning and the travel start time of the shutter when the still image is shot. According to this structure, it is possible to arbitrarily adjust the exposure time during the shooting of the still image.

The exposure time also can be set in response to the output level of the charges read by the scanning of the reading scanning without causing the shutter to travel after the scanning of the charge accumulation start scanning prior to shooting the still image. According to this structure, photometry of the object can be performed based upon the output level of the charges read during the shooting of the moving image and it is possible to set the exposure time during the shooting of the still image based upon that photometry.

As another option, the controller can control the characteristic of the scanning speed of the charge accumulation start scanning so as to match the changing characteristic of the travel speed of the shutter. According to this structure, it is possible to ensure a certain exposure time during the shooting of the still image even though the travel speed of the shutter is not constant.

As another option, the controller can control the scanning speed of the reading scanning so as to be longer than the scanning of the charge accumulation start scanning. According to this structure, it is possible to accurately perform the reading scanning.

As another option, the controller can control the scanning start time of the reading scanning so as to sequentially read the accumulated charges from the area of the imaging element by which the shutter has traveled and shaded. According to this structure, it is possible to start the reading scanning before the traveling of the shutter is completed.

As another option, the controller can generate a scanning start signal that instructs the scanning start of the charge accumulation start scanning and a travel start signal that instructs the scanning start of the shutter. Additionally, the generation period of the scanning start signal and of the travel start signal can be set based upon the exposure time and the delay time between the time when the travel start signal is generated and the time when the shutter actually begins to travel. According to this structure, it is possible to accurately control the exposure time during the shooting of the still image.

As another option, the scanning line of the imaging element scanned by the charge accumulation start scanning and by the reading scanning and the scanning line of the imaging element shaded by the travel of the shutter are substantially parallel. According to this structure, it is possible to ensure a uniform exposure time in the entire area of the imaging element.

According to another option, an image processor processes the charges read by the reading scanning as an image and a display displays the image processed by the image processor. In particular, the display displays the image obtained by alternately repeating the scanning of the charge accumulation start scanning and the reading scanning as a moving image without causing the shutter to travel. According to this structure, it is possible to monitor the moving image.

As another option, the controller can adjust the exposure time by causing the charge accumulation start scanning and the reading scanning to scan at the same speed and by controlling the scanning start period thereof. According to this structure, it is possible to arbitrarily adjust the exposure time during the shooting of the moving image.

As another option, the shutter can be a focal plane type shutter with at least one shutter curtain. According to this structure, it is possible to perform a shading of the imaging element that corresponds to the charge accumulation start scanning.

As another option, the imaging element can be an XY address type imaging element. According to this structure, it is possible to perform a charge accumulation start scanning that corresponds to the traveling of the shutter.

As another option, the imaging element can be an amplifying type imaging element. According to this structure, it is possible to shoot the moving image with less smear.

BRIEF DESCRIPTION OF THE DRAWINGS

The invention will be described in conjunction with the following drawings in which like reference numerals designate like elements and wherein:

FIG. 4 is a block diagram of an imaging device of an embodiment of the present invention;

DETAILED DESCRIPTION OF PREFERRED EMBODIMENTS

The following explains an embodiment of the present invention. However, the technical scope of the present invention is not limited to this embodiment.

In the imaging device in the described embodiment of the present invention, an imaging element of the XY address type having a vertical scanning part and a horizontal scanning part are used. Furthermore, the vertical scanning part has a reset scanning circuit that briefly resets the accumulated charge amount of the pixels to zero, as will be described later, to perform a charge accumulation start scanning (hereafter referred to as reset scanning) in which the accumulation of the charge starts from that point (at which it was reset to zero), and a reading scanning circuit that performs a reading scanning of the charges stored by the pixels. Shooting of a moving image is performed by alternately performing the reset scanning and the reading scanning in shifted phases.

Furthermore, the imaging device in the described embodiment of the present invention is provided with a shutter having a shutter curtain that corresponds to the rear curtain of a focal plane type shutter to shade the imaging element. This shutter can shade the imaging element at sufficient travel speed, and the difference of the shutter time point of the upper and lower screen is within an allowable range.

The principles of the still image shooting operation in this type of imaging device are explained with reference to FIGS. 1, 2A and 2B.

Figure 1:
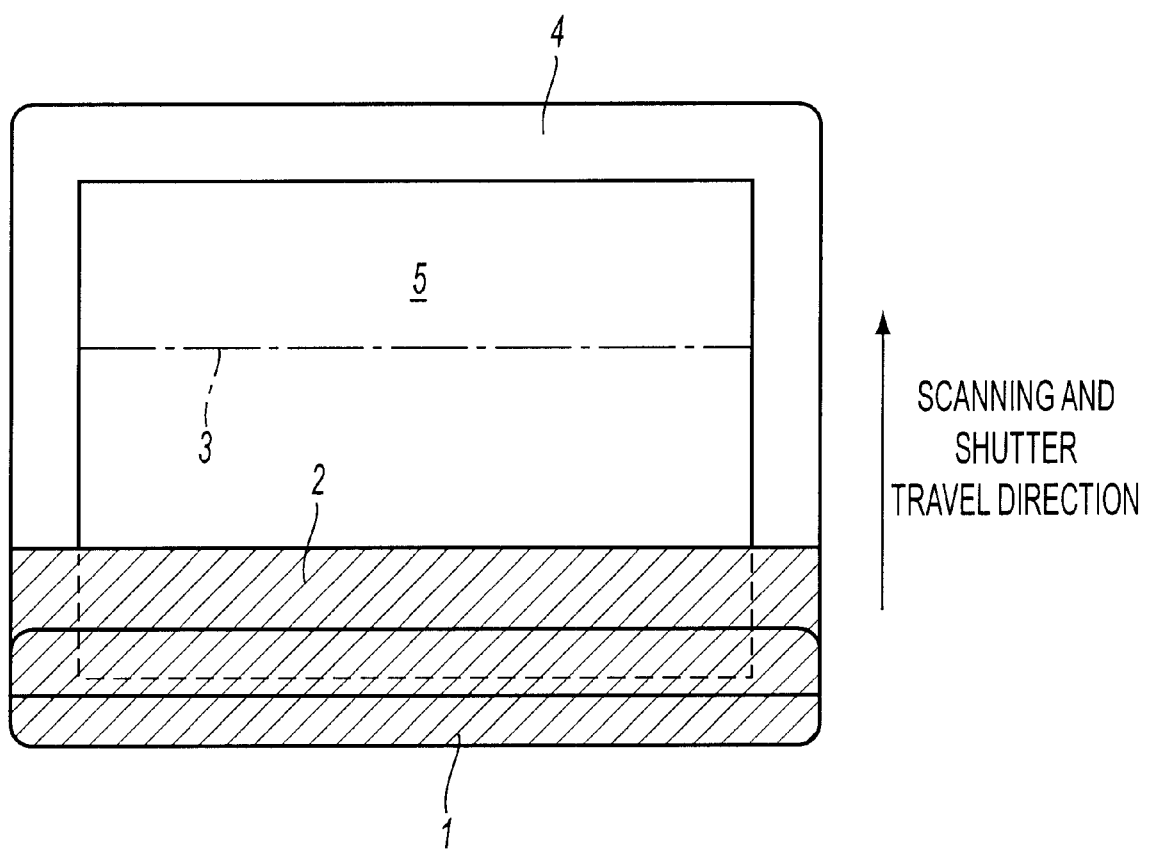
FIG. 1 schematically shows the reset scanning position and the shutter end position of the imaging surface for still image shooting.

FIG. 1 schematically shows during still image shooting, a reset scanning position 3 at which reset scanning that zeros the accumulated charge amount of each pixel of the imaging element, and a shutter end position 2 at which the shading starts (i.e., at which an edge of the shutter is located). According to FIG. 1, the shutter end position 2 on the imaging surface 5, which is located in the opening 4 of the mechanical focal plane shutter 1, and the reset scanning position 3 move from the top to the bottom of the imaging surface 5 at a specified interval. At this time, because the image to be shot is inverted (upside down) through the shooting lens as the scanning direction of the image, the reset scanning and shutter traveling are performed from the upper part to the lower part of the image. Furthermore, the shutter 1 is located so that the shutter end position 2 and the reset scanning position 3 move virtually in parallel.

Figure 2A:
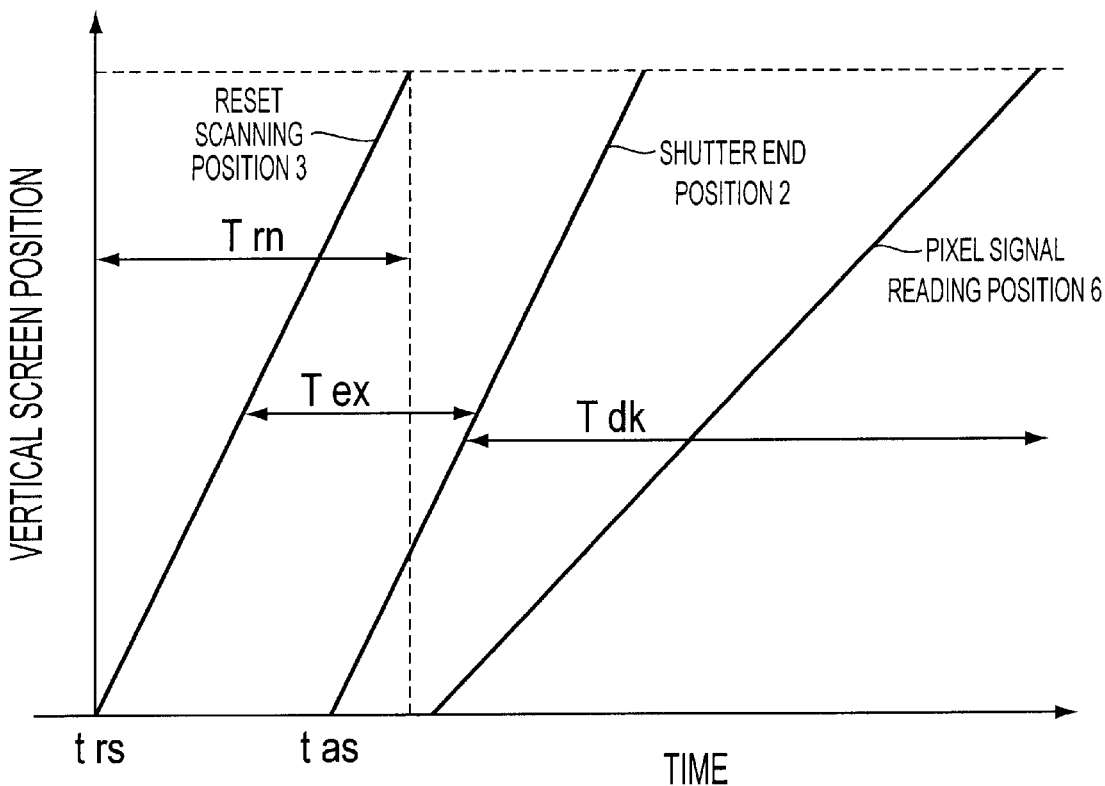
FIGS. 2A and 2B show the relationship between the reset scanning position, the shutter end position, the reading position of the pixels of the imaging element, and time.

FIG. 2A shows the relationship between the reset scanning position 3, the shutter end position 2, the reading position 6 of the pixels of the imaging elements, and time. The vertical axis shows the position in the vertical direction of the imaging surface 5. For example, the diagonal lines for positions 3 and 2 indicate the number of lines from the top line of the output screen and how many lines are in the shaded area of the shutter. In addition, FIG. 2B shows the clock frequency provided to the vertical scanning part of the imaging element during still image photography.

The moving image shooting is ordinarily performed in a state where the shutter curtain is constantly open (not traveling), and exposure control is performed by the electronic shutter mode as described above, that is, by controlling the charge accumulation time. On the other hand, the exposure time during the still image shooting, that is, the charge accumulation time Tex, is set based upon the output level of the charge read by the reading scanning during moving image shooting. That is, the time Tex for still image shooting is determined based on photometry performed during previous moving image shooting.

In FIG. 2A, in still image shooting, the previously mentioned reset scanning of the pixels is performed during the interval Trn, starting at time trs, at a speed synchronized with the traveling speed of the shutter curtain. Furthermore, the shutter curtain travel begins at a specified time tas, which is calculated from a specified exposure time Tex, to perform shading. Accordingly, the time Tex, which extends from the time at which the pixels of the imaging elements are reset-scanned until they are shaded by the shutter curtain, is the exposure time.

Additionally, during a portion of the shading time Tdk, the shutter curtain still travels and the reading scanning of the charges accumulated by the pixels is performed for the pixels for which shading is completed. As shown in FIG. 2B, the relationship between the clock frequency and the time is such that a high clock frequency is provided for the vertical scanning part for the imaging element during the time Trn, so that the reset scanning can be performed at high speed, whereas the accumulated charge is slowly read by providing a low clock frequency after the time Trn.

Furthermore, although not depicted, after the reading of the still image is completed, the shutter can open the optical path and move to its position for ordinary moving image shooting.

Figure 2B:
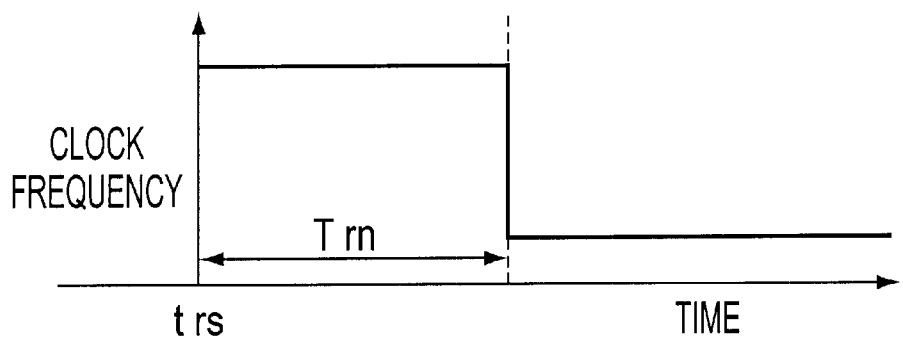
Figure 3A:
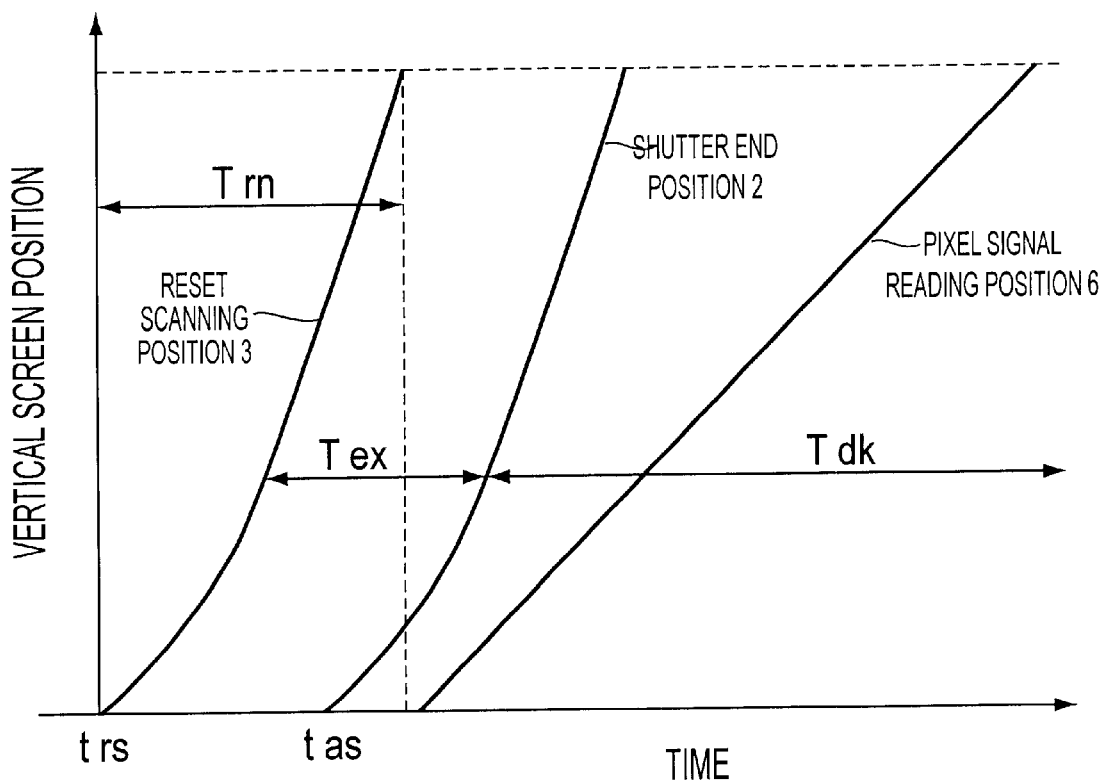
FIGS. 3A and 3B correspond to FIGS. 2A and 2B when the travel speed of the shutter is not constant.
Figure 3B:
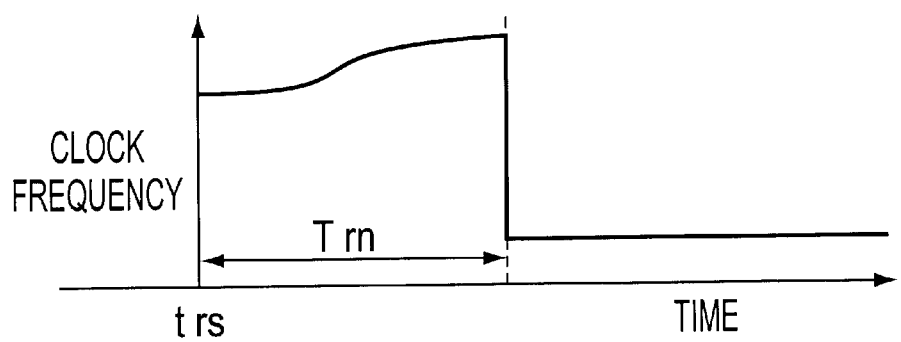

FIGS. 3A and 3B correspond to FIGS. 2A and 2B when the travel speed of the shutter curtain is not constant. There are cases in which the shutter curtain travel of the focal plane type shutter, which is used in the embodiment of the present invention, is not constant in terms of its travel speed. In cases like this, when the reset scanning speed is constant as shown in FIG. 2A, there will be an inconvenience such that the exposure time is different on the upper and lower portions of the screen. Thus, for example, a clock modulating circuit that modulates the scanning clock frequency used for the reset scanning is disposed in the vertical scanning part of the imaging element, and the desired exposure time Tex is maintained by matching the characteristics of the scanning speed of the reset scanning, by modulating the clock frequency, to the changing characteristics of the travel speed of the shutter curtain. For example, FIG. 3A schematically shows that the beginning of the shutter curtain travel, as normally seen, is slow, gradually becomes faster, and becomes almost constant toward completion of its travel. Thus, as shown in FIG. 3A, the clock frequency is changed by modulating the scanning clock so as to meet the change of the travel speed. Also, in this case, in the same manner as in FIGS. 2A and 2B as mentioned above, the shutter curtain travel for shading begins at a time period Tex following the reset scanning, and then the accumulated charge is slowly read from the shaded pixels.

Furthermore, it is possible to reduce the fluctuation of the speed by lengthening the slower speed, initial movement period of the shutter curtain travel, using an appropriate damper mechanism, or the like.

FIG. 4 is a block diagram of an imaging device according to an embodiment of the present invention having an imaging element and shutter that are operated based upon the above-mentioned principles. According to FIG. 4, the diaphragm control, zoom control, focus control, and the like of the shooting lens 41 are performed by the lens driver 42. The shutter 43 is a focal plane type shutter, and has a part that corresponds to the rear curtain of a focal plane shutter that is used for an ordinary single lens reflex camera. The shutter 43 is constantly open during the moving image shooting or the image monitoring and is controlled to be closed during the still image shooting as mentioned in the above principles.

The imaging element 45 is an XY address type imaging element that houses a reading scanning circuit and a pixel reset scanning circuit, as will be described later. Furthermore, a scanning clock and a specified control pulse, which will be described later, are provided from the pulse generator 46 to the imaging element 45. In the vertical scanning clock, among the scanning clocks generated by the pulse generator 46, as described in the above principles, the clock frequency is modulated at a specified frequency by the vertical drive modulator 47 and is provided to the imaging element 45. Furthermore, the pulse generator 46 also provides a clock signal to a signal processor 48.

Specified image processing is performed to the output signal, which is the charge that is accumulated by the imaging element 45, in the signal processor 48 and the output signal is provided to a picture signal bus 54 as a picture signal. The picture signal on the picture signal bus 54 is displayed on the monitor of an image display 49. The picture signal on the picture bus 54 also can be recorded in the signal recorder 50.

In addition, the picture signal detector 51 detects the data capacity of the picture signal from the picture signal on the picture signal bus 54, the shift in the white balance of the color signal, the high frequency component of the picture signal, and the like, and sends the detected results to the CPU 52 through the control data bus 55.

The CPU 52 functions as a control means for controlling the imaging device, and controls each part of the imaging device according to prestored programs and/or the instructions of the photographer input from the instructing part 53. Furthermore, CPU 52 performs the exposure control and auto focus control during the moving and still image shooting by controlling the lens driver 42, the shutter driver 44, and the pulse generator 46 upon receipt of the detected result from the picture signal detector 51. In addition, CPU 52 controls the white balance and brightness sensitivity setting of the picture signal by controlling the signal processor 48.

Figure 5:
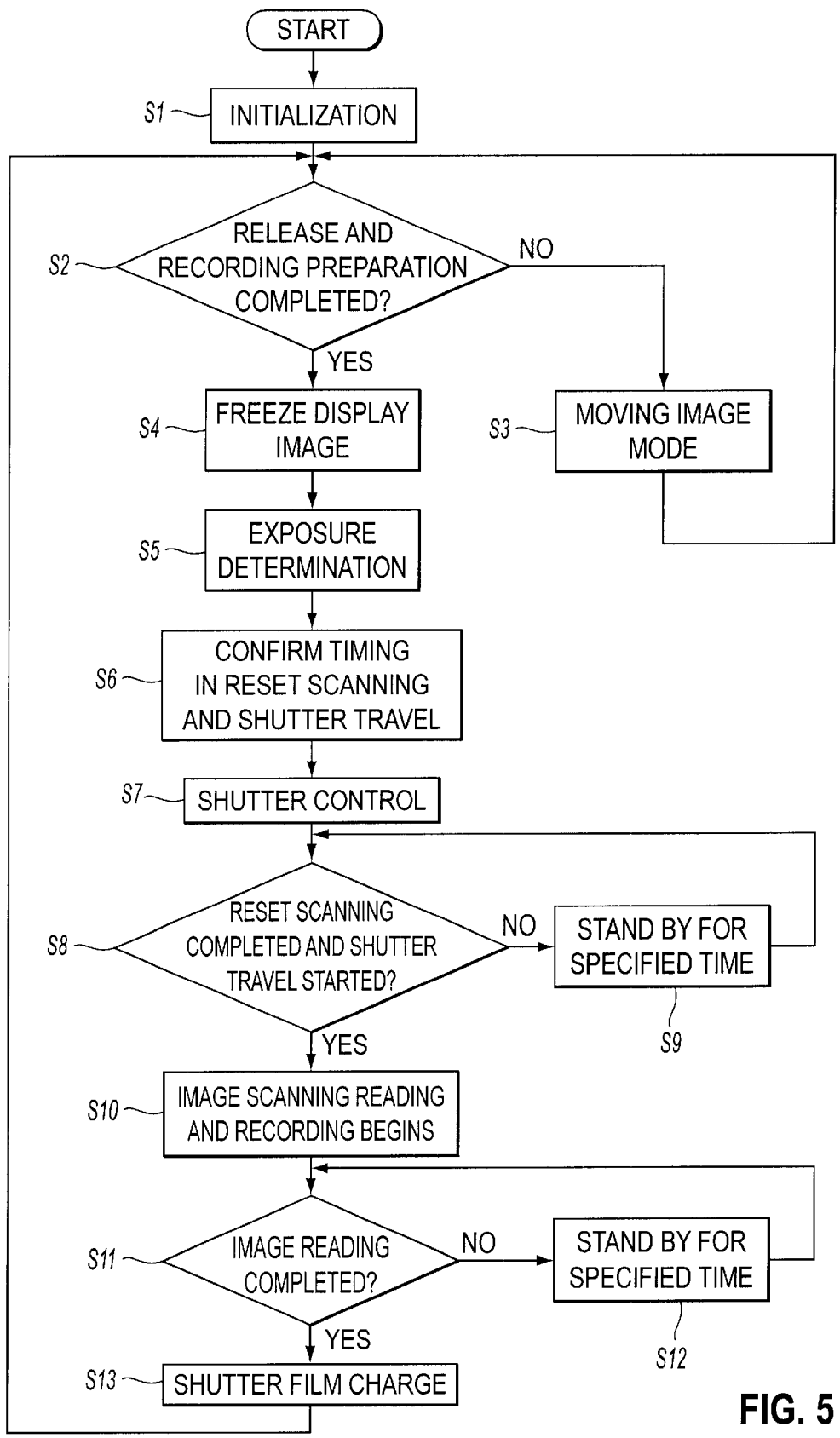
FIG. 5 is a flow chart showing the operation of the imaging device of an embodiment of the present invention.

FIG. 5 is a flow chart of the operation during the characteristic still image shooting in the imaging device of the embodiment of the present invention.

When the power to the imaging device is turned on, the following program sequence begins. First, the initialization of the imaging device (step S1) is performed. The program proceeds to the still image shooting mode upon the pressing of an undepicted release button by the photographer (step S2). At this time, it is checked whether the release button is pressed and whether preparation of the still image shooting is completed. This is because there are cases in which the operations of step S4 and beyond of the present flow chart of a previous still image shooting may not be completed. Therefore, if the result is "Yes" in step S2, the sequence of the still image shooting proceeds (to step S4 and beyond). If the result of step S2 is "No", moving image photography is performed in the moving image shooting mode (step S3). During the shooting of a moving image, the interrupt processing or the like are regularly or irregularly performed, and the program can enter into the sequence of the still image shooting by performing step S2.

In the still image shooting of step S4 and beyond, first, when the release button is pressed, in order to prevent the monitor screen from being interrupted by the shutter operation or the like, the monitor image which is displayed is frozen (step S4). After that, based upon data that was photometered during the moving image shooting or by other means, the exposure value (diaphragm value of the shooting lens, exposure time) of the still image photography is determined (step S5). Upon the receipt of the result, the start time point of the reset scanning of the imaging element 45 and the shutter travel timing are confirmed (step S6) and the shutter control is performed based upon these timings (step S7).

When the shutter control is being performed, by considering the shutter travel start delay, which will be discussed later, it is possible to check whether or not the shutter curtain travel has begun following the reset scanning (step S8). If "No", the program stands by for a certain period of time (step S9) and if "Yes", the reading scanning of the image (accumulated charge) is begun. The reading scanning is performed at a scanning speed slower than the predetermined reset scanning speed and the read image signal can begin to be recorded to the signal recorder 50 through the signal processor 48 (step S10). After waiting for the image reading to be completed (steps S11 and S12), the charge of the shutter curtain is performed and the shutter 43 is opened (step S13).

At this time, just like a general focal plane shutter, in the shutter mechanism in which an electromagnet and a spring are used, the phenomenon is known in that the time point at which the shutter curtain begins to travel is actually delayed with respect to the impression of the release signal from the release button. Meanwhile, such delay does not exist in the reset scanning of the imaging element. That is, when the release button is pressed, with respect to the reset scanning start signal and the shutter curtain travel start signal, which are output from CPU 52 in order to instruct the start and end of the exposure, there is no electrical delay in the reset scanning, but there is a mechanical delay in the shutter curtain travel. Thus, there will be the inconvenience such that the actual exposure time fluctuates.

Figure 6A:
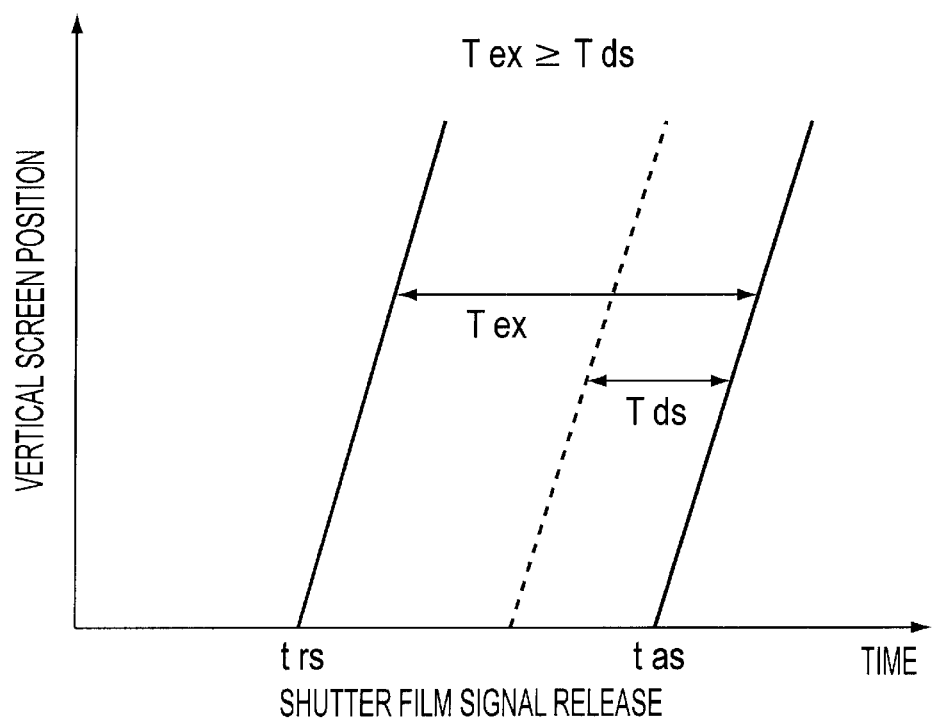
FIGS. 6A and 6B explain the fluctuation of the exposure time based upon the delay time in the start of movement of the shutter curtain.
Figure 6B:
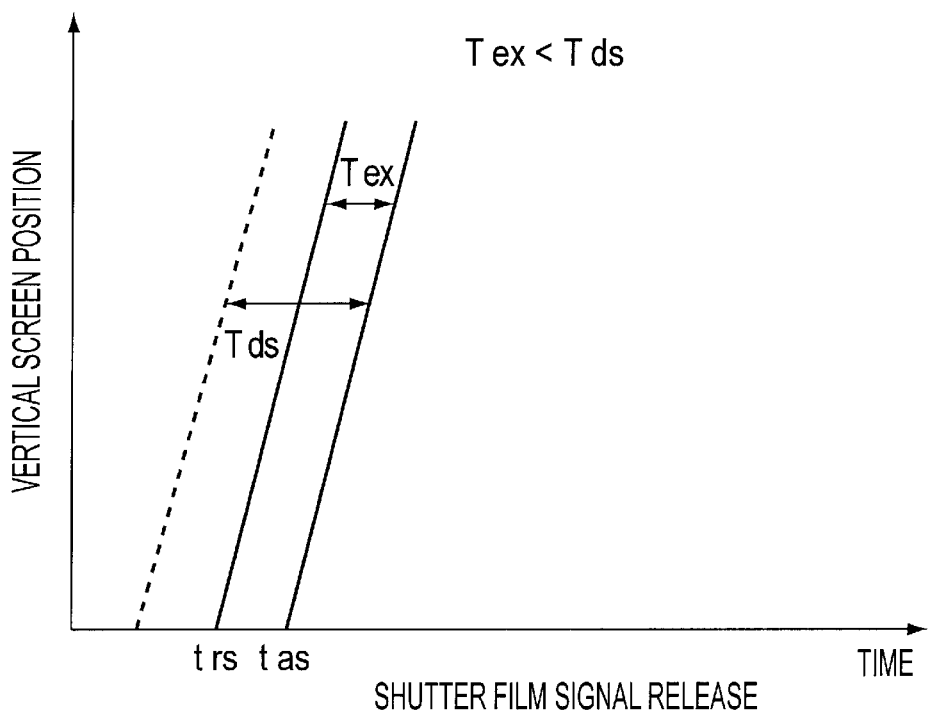

FIGS. 6A and 6B explain the fluctuation of the exposure time. FIG. 6A shows the case when the exposure time Tex is longer than the delay time Tds (i.e., the time between the output of release signal of the shutter curtain and the time that the travel of the shutter curtain begins). If the release signal of the shutter curtain is output after the exposure time Tex has elapsed, the exposure time would become too long by the amount of the delay time Tds. Therefore, in this case, the release signal of the shutter curtain is output before the exposure time Tex elapses. In particular, the release signal of the shutter curtain is output by the delay time Tds prior to expiration of the exposure time Tex, to ensure the correct exposure time Tex.

FIG. 6B shows the case when the exposure time Tex is shorter than the delay time Tds. In this case, even if the release signal of the shutter curtain is simultaneously output with the start trs of the reset scanning start time, the exposure time Tex would become too long. Accordingly, in cases like this, as shown in FIG. 6B, the release signal of the shutter curtain is output prior to time trs by an amount equal to the difference between the delay time and the exposure time Tex. By so doing, a specified exposure time Tex is ensured.

Figure 7:
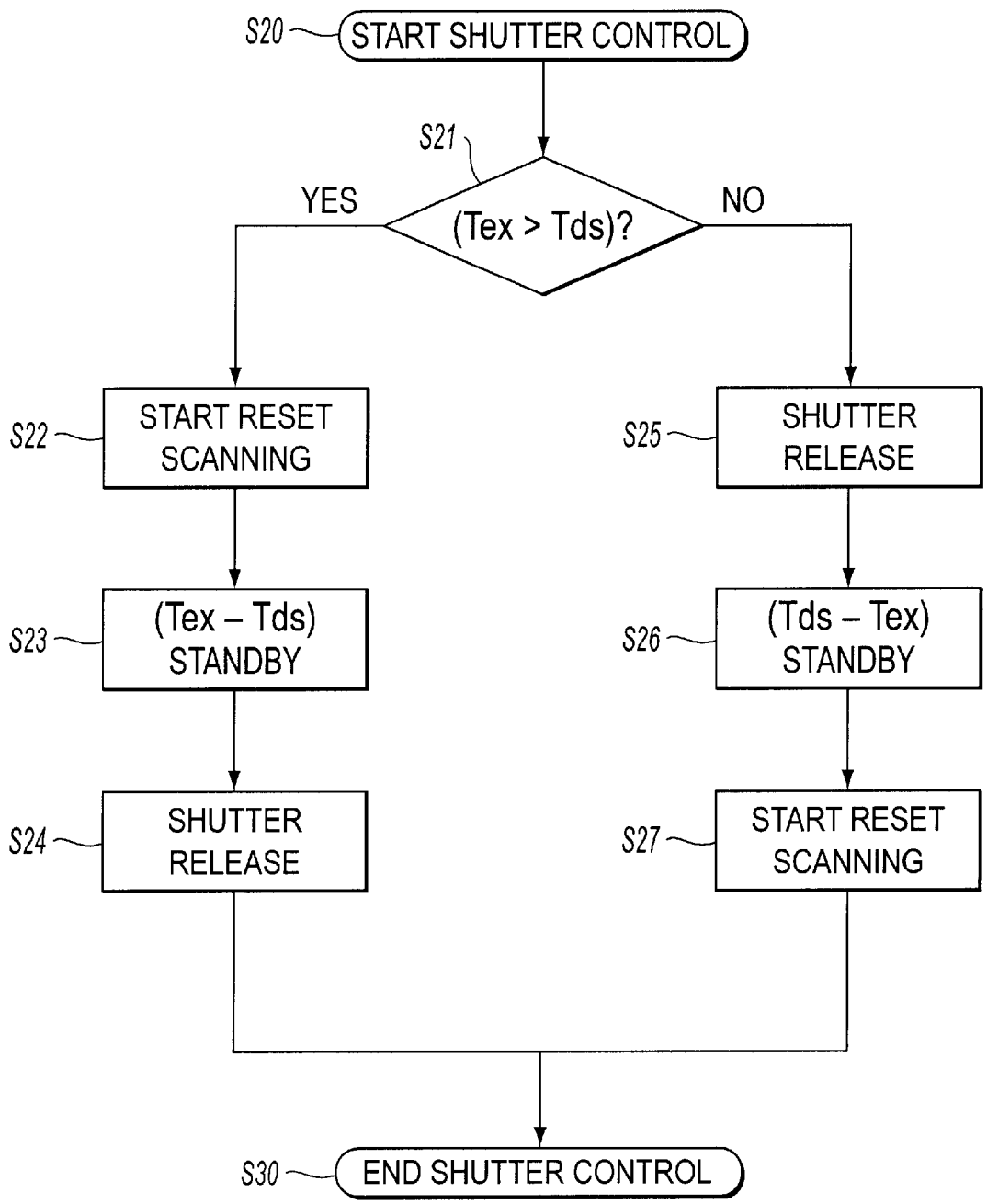
FIG. 7 is a flow chart of a procedure to control the timing of the travel of the shutter film and the reset scanning in FIG. 5.

Thus, in order to maintain the exposure time Tex, the timing between the reset scanning and the shutter curtain travel in step S6 of the flow chart in the above-mentioned FIG. 5 is controlled as shown in the flow chart of FIG. 7.

When the control of the shutter 43 begins (step S20), first, the time relationship between the exposure time Tex and the delay time Tds is determined (step S21). The reset scanning begins when the exposure time Tex is larger than or equal to Tds (step S22). The program stands by for a period equal to the delay time Tds subtracted from the exposure time Tex (step S23), and the release signal of the shutter curtain is then output (step S24).

When the delay time Tds is larger than Tex, first, the release signal of the shutter curtain is output (step S25). The program then stands by for a period equal to the exposure time Tex subtracted from the delay time Tds (step S26) and then the release signal of the shutter curtain is controlled so as to begin the reset scanning (step S27).

A camera back type of electronic camera (hereafter referred to as electronic camera back) is known in which an electronic camera is formed by disposing an imaging element unit in the position where the silver halide film of a single lens reflex camera ordinarily is disposed. In the shutter of the electronic camera back like this, the focal plane shutter having the front and back curtains is used and is usually in a shading state due to the front curtain.

It is possible to apply the embodiment of the present invention to an electronic camera back like this as follows. A mechanism that generates the same release signal as the release button disposed on the camera main body is disposed in the electronic camera back and the shutter driving part 44 is controlled by the release signal. After the power to the electronic camera back is turned on, or after the completion of the shutter charge, the release signal is generated and the shutter mode is made to be the flash mode by the shutter driver 44. By so doing, only the front curtain of the focal plane shutter travels and the imaging element is placed in an exposure state. In this state, the moving image shooting, the display of the picture signal on a monitor, or the exposure control is possible.

Moreover, when the still image shooting is performed in such a state, first, the release button which has been disposed in the electronic camera back main body is pressed. By so doing, as described above, the reset scanning of the pixels is performed and the flash mode is released after a specified time has elapsed. By causing the rear curtain to travel, still image shooting is possible. After the completion of the shutter charge, the shutter is placed in the flash mode by the release signal as described above, and a state occurs where only the front curtain travels.

In addition, by the above-mentioned release signal, it is possible to perform a control where an extremely long exposure time is set instead of performing a control where the shutter mode is made to be the flash mode. That is, when the release signal occurs, only the front curtain travels as described above, and the imaging element will be in an exposure state. At this time, when the release button is pressed, the reset scanning of the pixels is performed and the forced release signal of the exposure is output, and the rear curtain is caused to travel. By so doing, the exposure is completed and still image shooting is possible.

Furthermore, as described above, when the power to the electronic camera back is turned on and the shutter charge is completed, it is controlled so as to automatically cause only the front curtain of the shutter 43 to travel and to make the shutter 43 be in an open state. However, when moving image shooting is not performed, it is acceptable not to cause the front curtain to travel. In addition, when still image shooting is performed, the exposure control by the front and back curtain of the shutter 43, which is an ordinary exposure control method can be performed.

Figure 8:
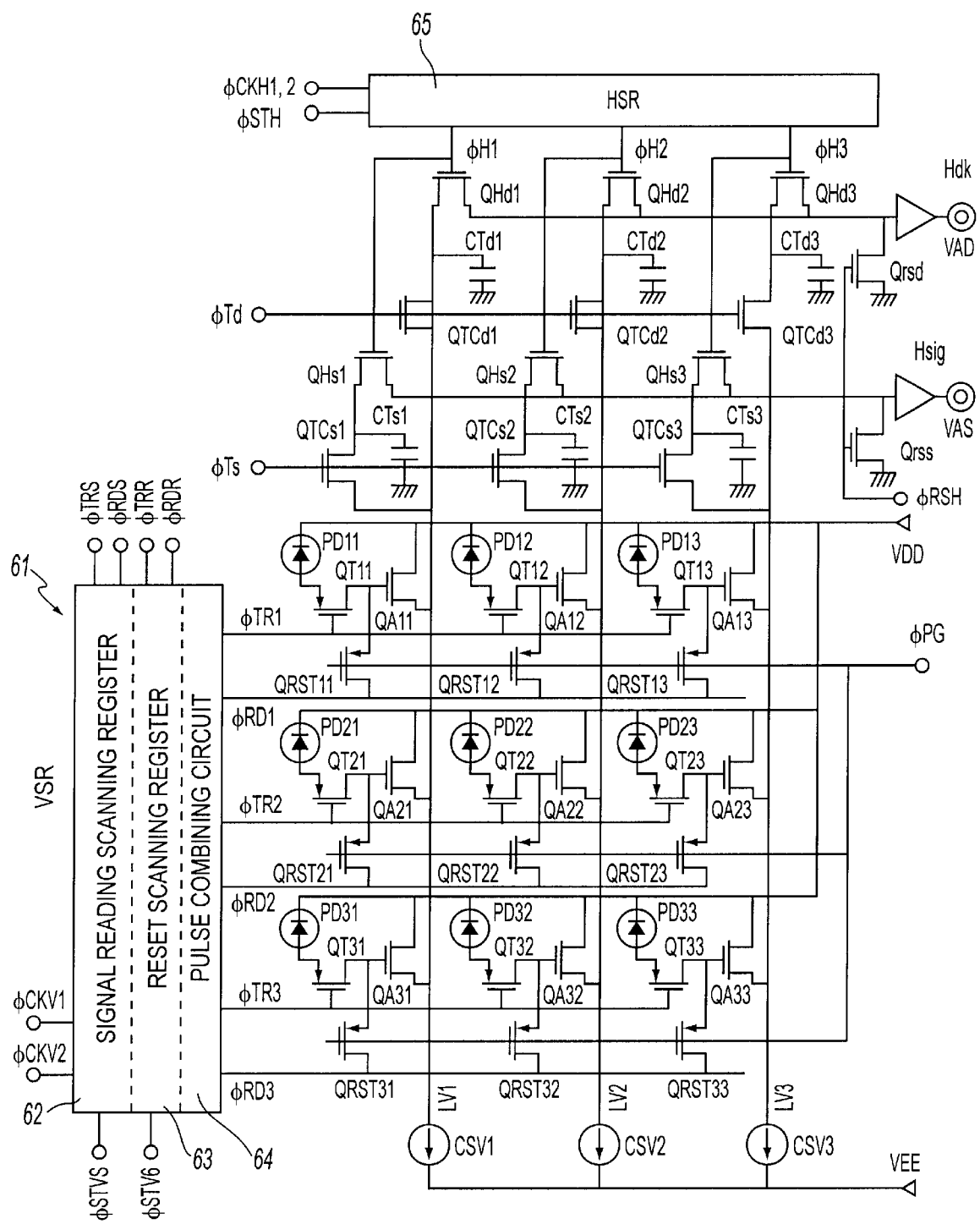
FIG. 8 is an explanatory drawing of the amplifying type imaging element of the XY address type, which can be used for the imaging device of an embodiment of the present invention.

FIG. 8 is an example of the amplifying type imaging element of the XY address type according to an embodiment of the present invention. The imaging element in FIG. 8 has a plurality of pixels disposed in matrix. A vertical scanning circuit VSR61 vertically scans, and a horizontal scanning circuit HSR65 horizontally scans. Furthermore, the pixels of the i line j row (i and j are integers) are formed by a aphotodiode PDij, transferring switch QTij, amplifying electrical field effect transistor (FET) QAij, and reset switch QRSTij.

The transferring switch QTij and the reset switch QRSTij are Pchannel—MOS switches so the operation is performed such that it is turned off when it is at a high level and it is turned on when it is at a low level. The transferring signal of the i line is øTri, which controls the charge transfer from the photodiode PDij of the i line to the gate of the amplifying electrical field effect transistor (FET) QAij. The reset signal of the i line is øRdi, which controls the reset potential of the gate of the amplifying electrical field effect transistor (FET). The reset control signal øPG is applied to the reset switches QRSTij in a batch.

The source of the FET (QAij) of the j row is connected to either the source or the drain of each of the common power source CSVj, the signal accumulation switch QTCsj, and the dark output accumulation switch QTCdj. Furthermore, one side of the signal accumulation switch QTCsj is connected to either the source or the drain of the signal accumulation condenser CTsj and the signal horizontal scanning switch QHsj. In addition, one side of the signal horizontal scanning switch QHsj is an output signal line and is connected to the signal line reset switch QRSS and the signal output amp VAS. Furthermore, another side of the dark output accumulation switch QTCdj is connected to either the source or the drain of the dark output accumulation condenser CTdj and the dark output horizontal scanning switch QHdj. Another side of the dark output horizontal scanning switch QHdj is a dark output line and is connected to the dark output reset switch QRSd and the dark output amp VDA.

The vertical scanning circuit VSR61 has a signal reading scanning register 62, a reset scanning register 63, and a pulse combining circuit 64. The scanning clocks øCKV1 and øCKV2 of the above two registers are input to the vertical scanning circuit VSR61. In addition, the start pulse øSTVS, the reading pixel transferring selecting pulse øTRS, and the reading potential selecting pulse øRDS are input to the signal reading scanning register 62.

The vertical scanning circuit VSR61 adds the start pulse øSTVS to a one line scanning portion when the signal scanning begins and the reading lines are sequentially selected by adding a specified scanning pulse to the scanning clocks øCKV1 and øCKV2. The reading pixel transferring selecting pulse øTRS and the reading potential selecting pulse øRDS control the pulse position of the reading line transferring signal øTRi and the reset signal øRDi. The vertical scanning circuit VSR61 also adds the reset start pulse øSTVR to a one line scanning portion when the reset scanning begins and the sequentially reset lines are selected by adding a specified scanning pulse to the scanning clock øCKV1 and øCKV2. The reset pixel transferring selecting pulse øTRR and the reset potential selecting pulse øRDR control the pulse position of the transferring signal øTRi of the reset line and the reset signal øRDi.

The basic operation of reading pixels is as follows. The reset signal øRDm of the FET (QAmn) of the m line, which is not set in the reading line, is fixed to a voltage which is less than or equal to the threshold of the FET (QAmn) (m and n are integers). As for the reading of the pixels of the i line selected by the vertical scanning circuit VSR61, the reset signal øRDi is set to a reading potential and the gate of the FET (QAij) is set to a reading potential as the transferring switch QTij is temporarily turned on and off. At this point, the signal øTd is added and the dark output is accumulated in the dark output accumulating condenser CTdj as the dark output accumulation switch QTCdj is turned on and off.

Then, by adding the transferring signal øTRi and turning the transferring switch QTij on, the signal of the photodiode PDij is transferred to the gate of the FET (QAij). Furthermore, the signal øTs is added after the transferring switch QTij is turned off and the signal output is accumulated in the signal accumulation condenser CTsj by turning the signal accumulation switch QTCsj on and off. These operations are performed during a so-called horizontal blanking period.

The signals accumulated in the signal accumulation condenser CTsj and the dark output accumulation condenser CTdj are output as signal voltages by turning the signal horizontal scanning switch QHsj and the dark output horizontal scanning switch QHdj on and off, respectively, which were selected by the horizontal scanning circuit HSR65. After this, by applying the signal øRSH to the horizontal signal line reset switches QRSS and QRSD, respectively, it is reset every time one pixel is transferred and is prepared for the transferring of the signal of the next pixel. The output signal is subtracted in an external circuit and is defined as a signal that eliminates the fixed pattern noise of the dark signal or the like. Thus, the reading line is scanned in the vertical scanning circuit VSR61 and the signals of one screen are obtained by repeating the above-mentioned operation for each line.

Figure 9:
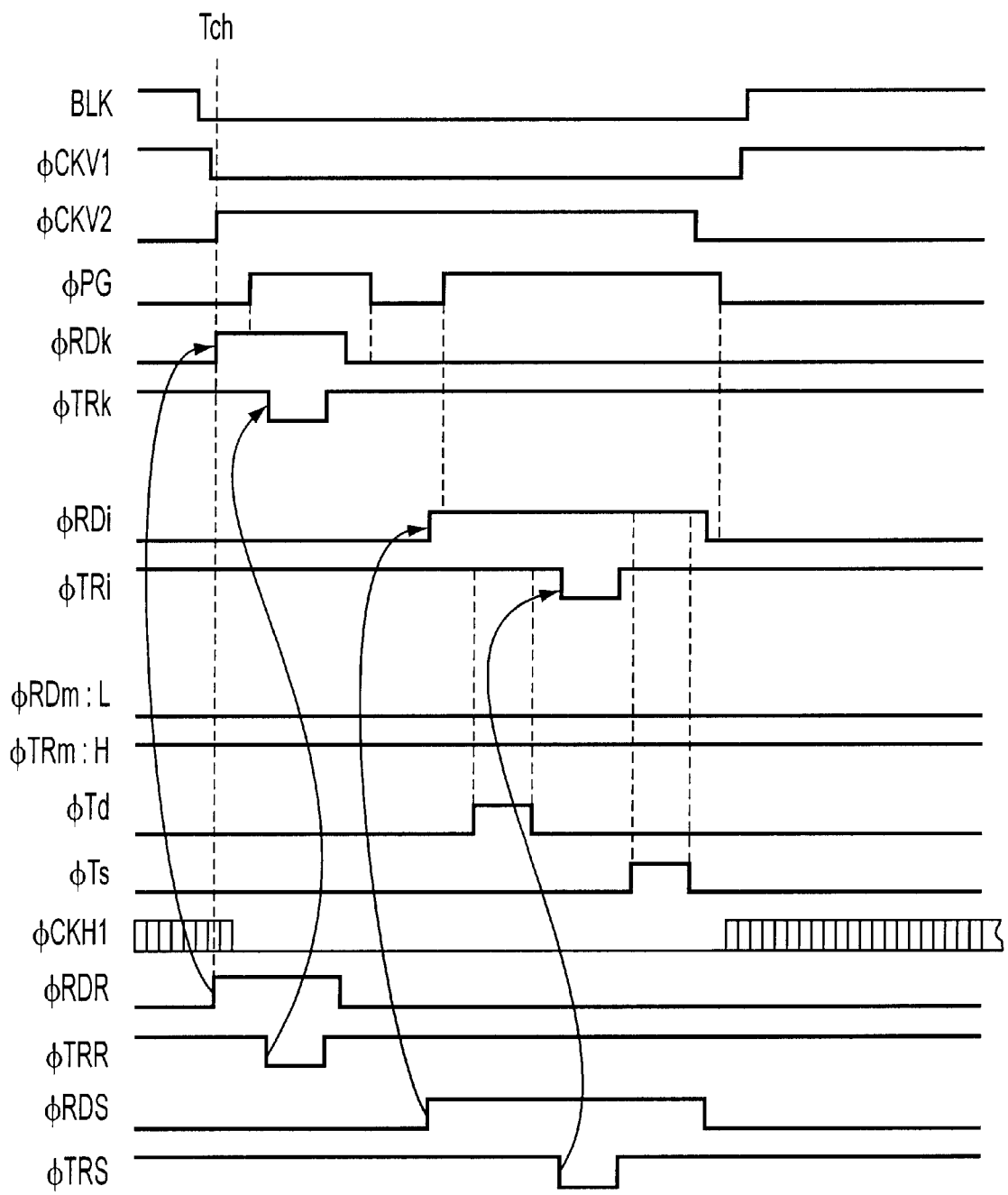
FIG. 9 is a timing chart during the electronic shutter operation.

FIG. 9 is a timing chart of the pulses during the electronic shutter operation. In FIG. 8, the i line is a signal reading line, the k line is a reset line, and the m line is the line during the signal accumulation. FIG. 9 illustrates the timing centered upon the horizontal blanking period BLK related to the line selection. Each voltage level is adjusted to the necessary amplification and DC level.

The vertical scanning clocks øCKV1 and øCKV2 are provided to the vertical scanning circuit VSR61, and the rise of the vertical scanning clock øCKV2 becomes the line switching position (Tch). In the signal reading line (i line), the signal reading scanning register 62 begins scanning by the reading start pulse øSTVS. When the i line is selected by the reading line, the reading pixel transferring selecting pulse øTRS and the reading potential selecting pulse øRDS are given to the reading scanning register 62, adjusted to the signal amplification and DC level needed for the operation of the imaging element, and output as the transferring signal øTRi and the reset signal øRDi, respectively.

In the same manner, in the reset line (k line), the reset scanning register 63 begins scanning by the reset start pulse øSTVR. When the k line is selected as the reset line, the reset pixel transferring selecting pulse øTRR and the reset potential selecting pulse øRDR are given to the reset scanning register 63, adjusted to the signal amplification and DC level needed for the operation of the imaging element and output as the transferring signal øTRk and the reset signal øRDk, respectively. Here, the transferring switches QTij and QTkj and the reset switches QRSTij and QRSTkj are P channel—MOS switches so that they are off at a high level and on at a low level. Furthermore, the reset switch QRST is normally turned on, and operates so as to turn off during the signal reading period.

Here, in order to operate the electronic shutter during the moving image shooting, prior to the scanning of the signal reading line (i line), it is acceptable to perform the scanning of the reset line (k line) and it is acceptable to add the reset start pulse øSTVR to the reading start pulse øSTVS prior to the exposure time in the imaging element. However, the exposure time becomes a control interval of an integer of the clock cycle in relation to the scanning clock and takes one frame period for the reset and the signal reading of the entire screen.

Moreover, the m lines other than the i and k lines are charge accumulation lines and the reset signal øRDm and transferring signal øTRm provided to the m lines are maintained at low and high level, respectively, so that the reset switch QRST remains in an "on" state and the transferring switch QT remains in an "off" state.

At this time, the reset of the pixel line and the reading of the pixel signals are as follows. That is, the reset signal øRDk is made to be at a high level of the reading potential by the reading potential selecting pulse øRDR, and when the reset control signal øPG reaches a high level, the reset switch QRSTkj is turned off and the gate of the FET (QAkj) is set at the reading potential. After this, when the transferring signal øTRk is made to be at a low level and then a high level by the reset pixel selecting pulse øTRR, the transferring switch QTkj is turned on and off, the charge of the photodiode PDkj is transferred to the gate of the FET (QAkj) and the photodiode PDkj is reset. After this, the reset signal øRDk is set at a low level less than the shut-off potential of the FET (QAkj). When the reset control signal øPG becomes a low level, the reset switch QRSTkj is turned on and when the FET (QAkj) is shut off, it is simultaneously reset by discharging the charge that is in the gate.

Meanwhile, during this period, in the signal reading line i, the reset signal øRDi is fixed at the shut-off potential and the FET (QAij) is also shut off. After the completion of the resetting of the k line, the reset signal øRDi is made to be the reading potential by the reading potential selecting pulse øRDS and when the reset control signal øPG becomes a high level, the reset switch QRSTij is turned off and the gate of the FET (QAij) is set at the reading potential. At this time, the dark signal is stored in the dark output accumulating condenser CTij by turning the dark output accumulation switch QTCsj on and off by the signal øTd. After that, the transferring signal øTRi becomes a low level by the reading pixel selecting pulse øTRS, the transferring switch QTij is turned on, and the charge of the photodiode PDij is transferred to the gate of the FET (QAij). Furthermore, when the transferring signal øTRi becomes a high level, the transferring switch QTij is turned off. Moreover, an optical signal is stored in the signal accumulating condenser CTsj by turning the signal accumulation switch QTCsj on and off by the signal øTs. After this, the reset signal øRDi is made to be a low level by the reading potential selecting pulse øRDS and the FET (QAij) is shut off. During this time (while the reset signal øRDi is at a high level), the horizontal scanning clock øCKH1 is not provided to the horizontal scanning circuit HSR65. Furthermore, after that, the optical signal Hsig and the dark signal Hdk accumulated in the signal accumulation condenser CTsj and the dark output accumulation condenser CTdj, respectively, are scanned in the horizontal scanning circuit 65 and the horizontal switch øQHj and output.

Figure 10:
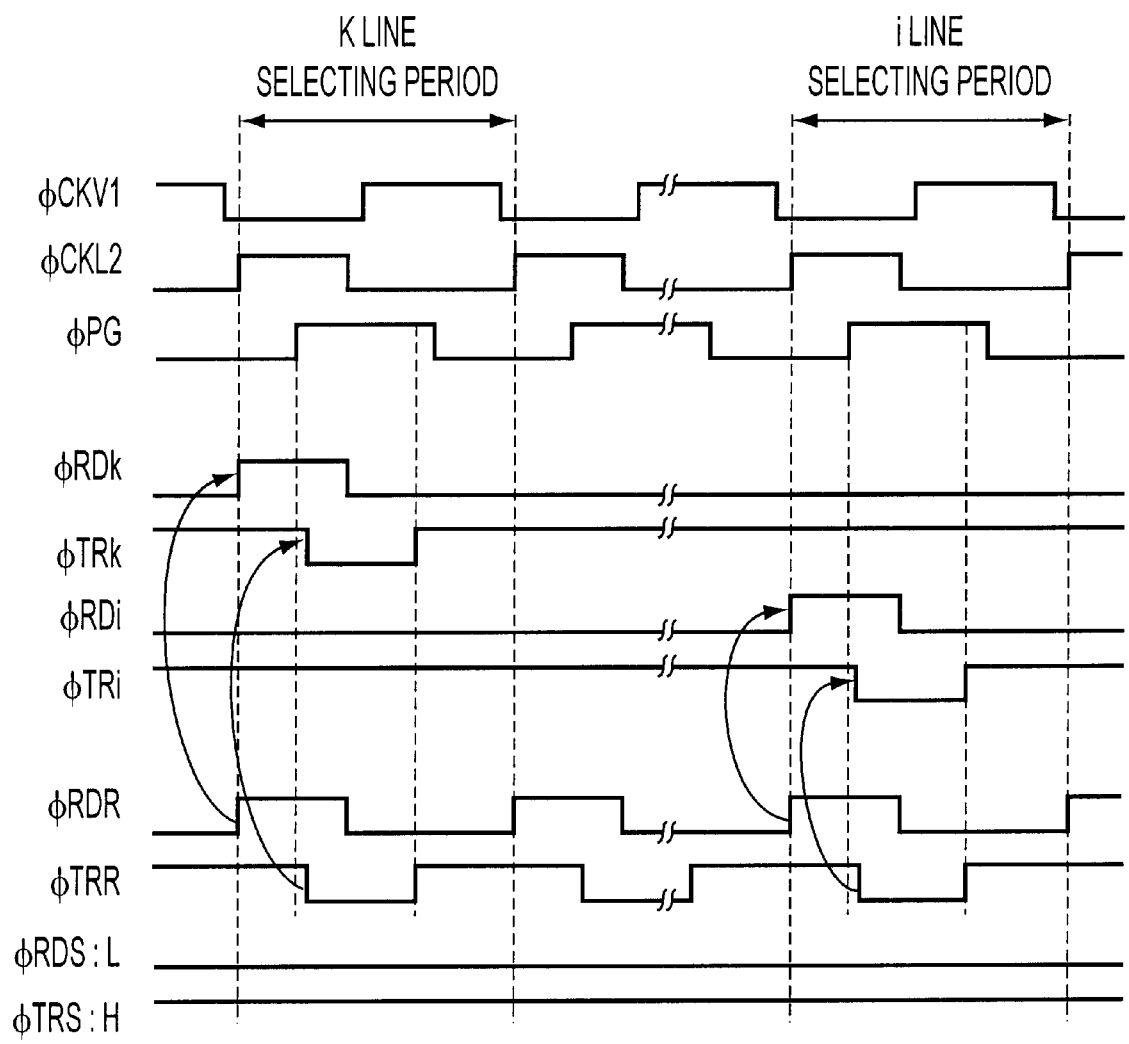
FIG. 10 is a timing chart of the reset scanning during still image shooting.
Figure 11A:
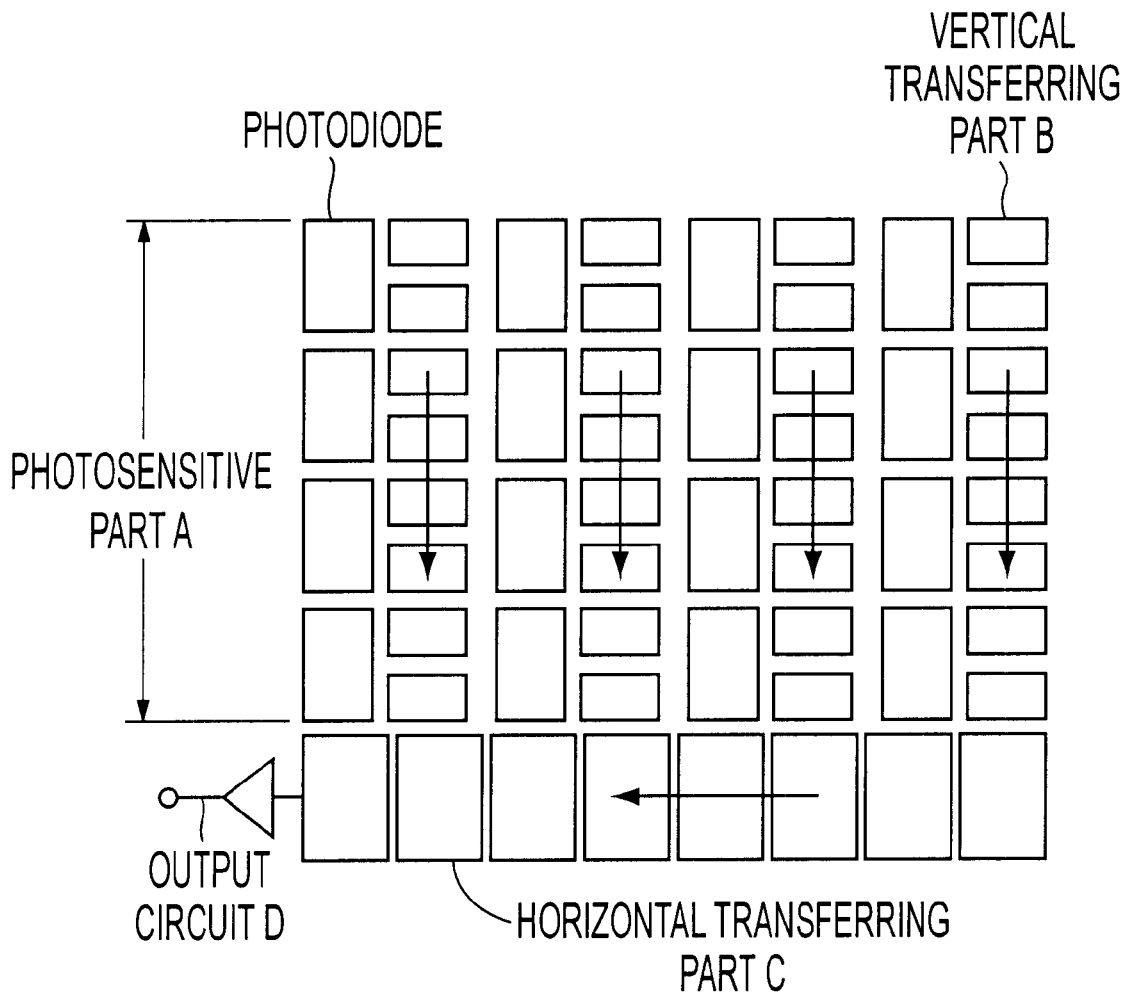
FIGS. 11A and 11B show an example of the structure of a conventional CCD.
Figure 11B:
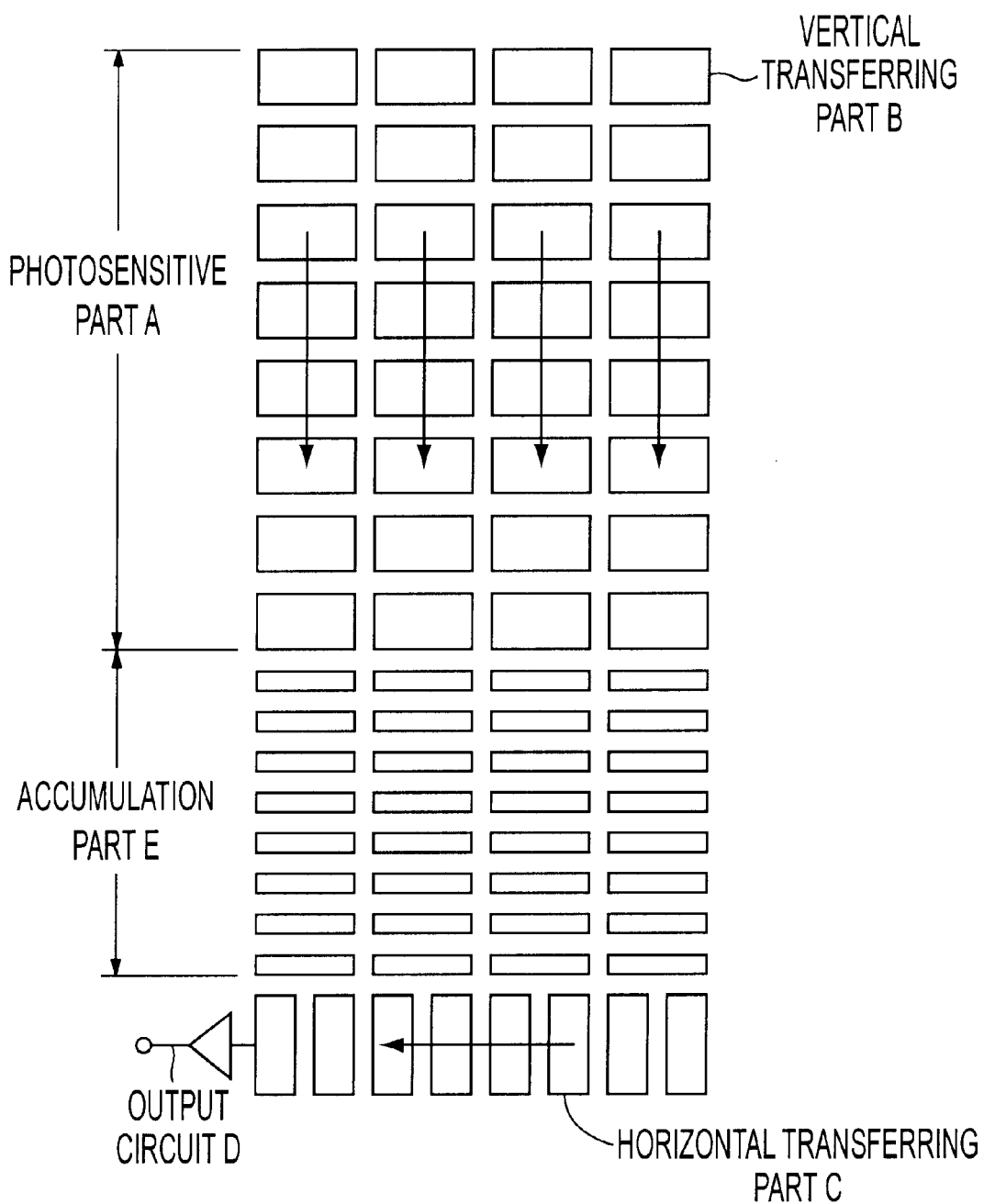

FIG. 10 is a timing chart of the reset scanning during the still image shooting in the present imaging element. At this time, the reading start pulse øSTVS, the reading pixel transferring selecting pulse øTRS, and the reset potential selecting pulse øRDS are not added to the signal reading scanning register 62 and the reading signal is not added to the pixels. The signals øTs and øTd and the reading circuits such as a shift register or the like in the horizontal scanning circuit 65 may operate if desired, but their operation is not needed.

During the selecting period of the $k^{th}$ line of FIG. 10, the reset signal øRDk changes the cut-off potential of the FET (QAkj) from a low level to a high level of the reading potential by the reset potential selecting pulse øRDR. Furthermore, by making the reset control signal øPG a high level, when the reset switch QRSTkj, which has been turned on, is turned off, the FET (QAkj) is fixed at the reading potential. After that, when the transferring signal øTRk is made to be at a low level and then a high level by the reset pixel transferring selecting pulse øTRR, the transferring switch QTkj is turned on and off accordingly, the charge of the photodiode PDkj is transferred to the gate of the FET (QAkj), and the photodiode PDkj is reset. Furthermore, by returning the reset signal øRDk to a low level and making the reset control signal øPG a low level, the reset swtich QRSTkj is turned on and the FET (QAkj) is made to be the cut-off potential. At the same time, the charge on the gate of the FET (QAkj) is discharged and the reset operation of the k line is completed. When the selected line is scanned and the i line is selected, the line reset is performed in the same manner.

It is possible to perform a reset scanning for the still image as the reset operation is performed for each line at a speed that matches the travel of the shutter.

Figure 12:
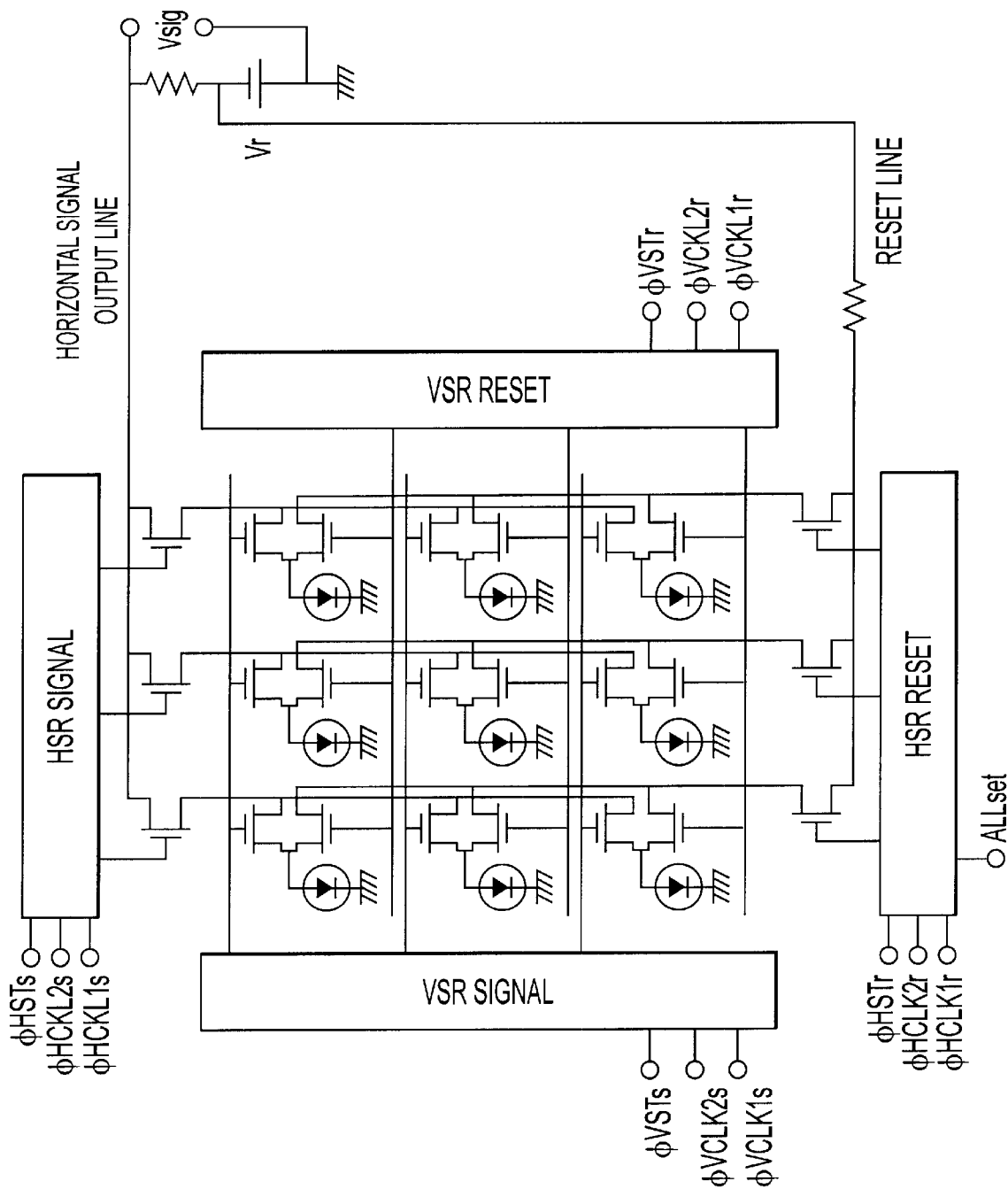
FIG. 12 shows an example of a MOS type imaging element of the XY address type.

The present invention is not limited to the amplifying type imaging element of the above-mentioned XY address type and can be applied to a MOS type imaging element of the XY address type. The reset scanning at high speed is performed by the MOS type imaging element for the electronic shutter as shown in the above-mentioned FIG. 12.

First, the circuit in which all the reset horizontal switches are turned on in the horizontal scanning register, which is not depicted in the reset horizontal scanning circuit HSRReset and the terminal ALLset are provided, and by setting them, the reset vertical signal line extending from the reset vertical scanning circuit VSRReset is made to be the reading potential Vsig. Furthermore, if the start pulse øVSTr and the high speed scanning clock VCKLs 1r and VCKLs 2r are input to the reset vertical scanning circuit VSRReset, the photodiode PDij of each line can be reset-scanned in the same manner. Furthermore, when a dynamic shift register circuit is used for the horizontal scanning register, it is possible to turn all the horizontal switches on for a short period of time by making the start pulse øVSTr and the two-phase scanning clocks VCKL1r and VCKL2r a high level, and the same thing can be performed without providing the earlier-mentioned additional circuit (the circuit which turns all the reset horizontal switches on) in the horizontal scanning register.

As explained above, according to the imaging device of the present invention, in times of moving image shooting, it is possible to perform the moving image shooting by performing an exposure control by the photoelectric charge accumulation time control of the pixels while the focal plane shutter is open.

In still image shooting, by performing the reset scanning (scanning to set the accumulated charge to zero) of the pixels along with the shutter curtain travel of the focal plane shutter, still image shooting in which all the pixels are constant in the exposure time can be performed. Furthermore, it is possible to perform the still image shooting in a sufficiently accurate exposure time control by causing the shutter curtain to control the travel start period of the focal plane shutter so that the charge accumulation time becomes the exposure time and by reading the signal charge after the pixels are shaded. Moreover, the high speed reading is not needed during the signal reading.

The imaging element (photoelectric converter) can be, for example, a CMOS device or a PSD (Photo-Sensitive-Diode).

In the illustrated embodiment, the controller (CPU 52) is implemented using a suitably programmed general purpose computer, e.g., a microprocessor, microcontroller or other processor device (CPU or MPU). It will be appreciated by those skilled in the art, that the controller can also be implemented as a single special purpose integrated circuit (e.g., ASIC) having a main or central processor section for overall, system-level control, and separate sections dedicated to performing various different specific computations, functions and other processes under control of the central processor section. The controller can also be implemented using a plurality of separate dedicated or programmable integrated or other electronic circuits or devices (e.g., hard-wired electronic or logic circuits such as discrete element circuits, or programmable logic devices such as PLDs, PLAs, PALs or the like). The controller can also be implemented using a suitably programmed general purpose computer in conjunction with one or more peripheral (e.g., integrated circuit) data and signal processing devices. In general, any device or assembly of devices on which a finite state machine capable of implementing the flow charts shown in FIGS. 5 and 7 can be used as the controller.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An imaging apparatus comprising:
   a photoelectric converter that converts accumulated light into electrical charges;
   a mechanical shutter that includes a light-shielding member that is movable in a first direction to selectively shade the photoelectric converter from light; and
   a controller that controls the photoelectric converter and the shutter, the controller controlling the photoelectric converter to perform: (a) charge accumulation start scanning in which initiation of charge accumulation in the photoelectric converter proceeds in series across the photoelectric converter at a speed that is based upon a movement speed and direction of the light shielding member of the mechanical shutter, and (b) reading scanning of the electrical charges accumulated in the photoelectric converter, wherein the controller determines a scanning start time to initiate the charge accumulation start scanning and a travel start time to initiate a start of movement by the light shielding member of the mechanical shutter based upon an exposure time and a delay time, the delay time being equal to a difference between a time when the light shielding member of the mechanical shutter is instructed to begin moving and a time when the light shielding member of the mechanical shutter actually, begins to move.

2. The imaging apparatus of claim 1, wherein the controller sets the exposure time in response to an output level of the electrical charges read from the photoelectric converter without the light shielding member of the mechanical shutter being caused to move prior to a still image shooting and after the charge accumulation start scanning is performed.

3. The imaging apparatus of claim 1, wherein the controller controls a scanning speed of the charge accumulation start scanning to match changes in a speed by which the light shielding member of the mechanical shutter moves.

4. The imaging apparatus of claim 1, wherein the controller controls a scanning speed of the reading scanning to be slower than a scanning speed of the charge accumulation start scanning.

5. The imaging apparatus of claim 1, wherein the controller controls a scanning start time of the reading scanning to sequentially read the accumulated electrical charges from areas of the photoelectric converter once the areas have been shaded by the light shielding member of the mechanical shutter.

6. The imaging apparatus of claim 1, wherein a scanning line of the photoelectric converter scanned during the charge accumulation start scanning and during the reading scanning is substantially parallel to a scanning line of the photoelectric converter shaded by the movement of the light shielding member of the mechanical shutter.

7. The imaging apparatus of claim 1, further comprising:
an image processor that processes the electrical charges read by the reading scanning into an image; and
an image display coupled to the image processor to display the image processed by the image processor;
wherein the image display displays the image by alternately repeating the charge accumulation start scanning and the reading scanning as a moving image without causing the light shielding member of the mechanical shutter to move.

8. The imaging apparatus of claim 7, wherein the controller adjusts the exposure time by performing the charge accumulation start scanning and the reading scanning at a same speed and by controlling the scanning start time of the charge accumulation start scanning and a scanning sartime of the reading scanning.

9. The imaging apparatus of claim 1, wherein the mechanical shutter is a focal plane type shutter and the light-shielding member is at least one shutter curtain of the focal plane type shutter.

10. The imaging apparatus of claim 1, wherein the photoelectric converter is an XY address type photoelectric converter.

11. The imaging apparatus of claim 10, wherein the photoelectric converter is an amplifying type photoelectric converter.

12. An imaging apparatus comprising:
imaging means for converting accumulated light into electrical charges;
a light-shielding member that is movable in a first direction for movably shading the imaging means from the light;
first scanning means for performing charge accumulation start scanning of the imaging means in which initiation of charge accumulation in the imaging means proceeds in series across the imaging means at a speed that is based on a movement speed and direction by which the light-shielding member moves to shade the imaging means;
second scanning means for performing reading scanning of the electrical charges accumulated in the imaging means; and
control means for controlling the scanning of the first scanning means, the scanning of the second scanning means and movement of the light-shielding member, wherein the control means generates a scanning start signal to instruct a start of scanning by the first scanning means and a travel start signal to instruct a start of movement by the light-shielding member, and the control means determines generation times of the scanning start signal and of the travel start signal based upon an exposure time and a delay time, the delay time being equal to a difference between a time when the light-shielding member is instructed to begin shading and a time when the light-shielding member actually begins to shade.

13. The imaging apparatus of claim 12, wherein the control means sets the exposure time in response to an output level of the electrical charges read by the second scanning means without the light-shielding member being caused to move prior to a still image shooting and after the scanning of the first scanning means.

14. The imaging apparatus of claim 12, wherein the control means controls a scanning speed of the first scanning means so as to match changes in a speed by which the light-shielding member moves.

15. The imaging apparatus of claim 12, wherein the control means controls a scanning speed of the second scanning means so as to be slower than a scanning speed of the first scanning means.

16. The imaging apparatus of claim 12, wherein the control means controls a scanning start time of the second scanning means so as to sequentially read the accumulated electrical charges from areas of the imaging means once the areas have been shaded by the light-shielding member.

17. The imaging apparatus of claim 12, wherein a scanning line of the imaging means scanned by the first scanning means and by the second scanning means and a scanning line of the imaging means shaded by the movement of the light-shielding member are substantially parallel.

18. The imaging apparatus of claim 12, further comprising:
image processing means for processing the electrical charges read by the scanning of the second scanning means into an image; and
image display means for displaying the image processed by the image processing means;
wherein the image display means displays the image by alternately repeating the scanning of the first scanning means and of the second scanning means as a moving image without causing the light-shielding member to move.

19. The imaging apparatus of claim 18, wherein the control means adjusts the exposure time by causing the first scanning means and the second scanning means to scan at a same speed and by controlling the scanning start time of the first scanning means and a scanning start time of the second scanning means.

20. The imaging apparatus of claim 12, wherein the light-shielding member is at least one shutter curtain of a focal plane type shutter.

21. The imaging apparatus of claim 12, wherein the imaging means is an XY address type photoelectric converter.

22. The imaging apparatus of claim 21, wherein the photoelectric converter is an amplifying type photoelectric converter.

23. A method of controlling an imaging apparatus having a photoelectric converter that converts light into electrical charges and a mechanical shutter that includes a light-shielding member that is movable in a first direction to selectively shade the photoelectric converter from light, comprising the steps of:

charge accumulation start scanning the photoelectric converter, in which initiation of charge accumulation in the photoelectric converter proceeds in series across the photoelectric converter at a speed that is based upon a movement speed and direction of the light-shielding member of the mechanical shutter; and reading scanning of the electrical charges accumulated in the photoelectric converter, wherein the charge accumulation start scanning step includes the steps:

generating a scanning start signal to instruct a start of the charge accumulation start scanning and a travel start signal to instruct a start of movement by the light-shielding member of the mechanical shutter; and determining generation times of the scanning start signal and of the travel start signal based upon an exposure time and a delay time, the delay time being equal to a difference between a time when the light-shielding member of the mechanical shutter is instructed to begin shading and a time when the light-shielding member of the mechanical shutter actually begins to shade.

24. The method of claim 23, further comprising the step of determining the exposure time in response to an output level of the electrical charges read by the reading scanning without the light-shielding member of the mechanical shutter being caused to move prior to a still image shooting and after the scanning of the charge accumulation start scanning.

25. The method of claim 23, wherein the charge accumulation start scanning step includes controlling a scanning speed of the charge accumulation start scanning to match changes in a speed by which the light-shielding member of the mechanical shutter moves.

26. The method of claim 23, wherein the reading scanning step includes controlling a scanning speed of the reading scanning to be slower than a scanning speed of the charge accumulation start scanning.

27. The method of claim 23, wherein the reading scanning step includes controlling a scanning start time of the reading scanning so as to sequentially read the accumulated electrical charges from areas of the photoelectric converter once the areas have been shaded by the light-shielding member of the mechanical shutter.

28. The method of claim 23, wherein a scanning line by which the photoelectric converter is scanned during the charge accumulation start scanning and during the reading scanning is substantially parallel to a scanning line by which the photoelectric converter is shaded by the movement of the light-shielding member of the mechanical shutter.

29. The method of claim 23, further comprising:

image processing the electrical charges read by the reading scanning into an image; and displaying the image processed by the image processing step by alternately repeating the charge accumulation start scanning and the reading scanning as a moving image without causing the light-shielding member of the mechanical shutter to move.

30. The method of claim 29, further comprising the step of adjusting the exposure time by causing the charge accumulation start scanning and the reading scanning to scan at a same speed and by controlling the scanning start time of the charge accumulation start scanning and a scanning start time of the reading scanning.

31. The method of claim 23, wherein the mechanical shutter is a focal plane type shutter and the light-shielding member is at least one shutter curtain of the focal plane type shutter.

32. The method of claim 23, wherein the photoelectric converter is an XY address type photoelectric converter.

33. The method of claim 32, wherein the photoelectric converter is an amplifying type photoelectric converter.

* * * * *